Fig. 1.

Inventor:
James T. Catlett,
by Harry E. Dunham
His Attorney.

May 5, 1942. J. T. CATLETT 2,282,031
WELDING APPARATUS
Filed Jan. 27, 1940 6 Sheets-Sheet 2

Fig. 2.

Inventor:
James T. Catlett,
by Harry E. Dunham
His Attorney.

May 5, 1942.  J. T. CATLETT  2,282,031
WELDING APPARATUS
Filed Jan. 27, 1940  6 Sheets-Sheet 3

Fig.3.

Inventor:
James T. Catlett,
by Harry E. Dunham
His Attorney.

May 5, 1942.  J. T. CATLETT  2,282,031
WELDING APPARATUS
Filed Jan. 27, 1940   6 Sheets-Sheet 6

Inventor:
James T. Catlett,
by Harry E. Dunham
His Attorney.

Patented May 5, 1942

2,282,031

UNITED STATES PATENT OFFICE 2,282,031

WELDING APPARATUS

James T. Catlett, Scotia, N. Y., assignor to General Electric Company, a corporation of New York Application January 27, 1940, Serial No. 315,995

11 Claims. (Cl. 219—14)

My invention relates to welding apparatus and more particularly to a gas-arc welding torch of improved construction.

It is an object of my invention to provide a gas-arc welding torch in which a plurality of identical means provided for holding and feeding electrodes are interchangeably supported in a row along a line of welding in any one of a plurality of spaced positions greater in number than the number of said electrode holding and feeding means.

It is a further object of my invention to provide a gas-arc welding torch in which a plurality of identical mechanisms each of which alone or in side-by-side relationship is capable of operating, through independent transmissions, a group of said electrode holding and feeding means located in consecutive positions in a row in their supporting means.

It is also an object of my invention to provide a gas-arc welding torch in which means are provided for interchangeably supporting said mechanisms in any one of a plurality of positions spaced to match the spacing of said electrode holding and feeding means in their said supporting means.

Another object of my invention is to provide a gas-arc welding torch having a nozzle of improved construction.

Further objects of my invention will become apparent from a consideration of the following description of a multi-arc atomic hydrogen welding torch embodying my invention.

The atomic hydrogen torch illustrated in the drawings is a ten-arc torch in which eighteen arc locations are provided so that the ten arcs may be arranged at varying intervals to vary the heat distribution along the line of welding.

Figure 1:
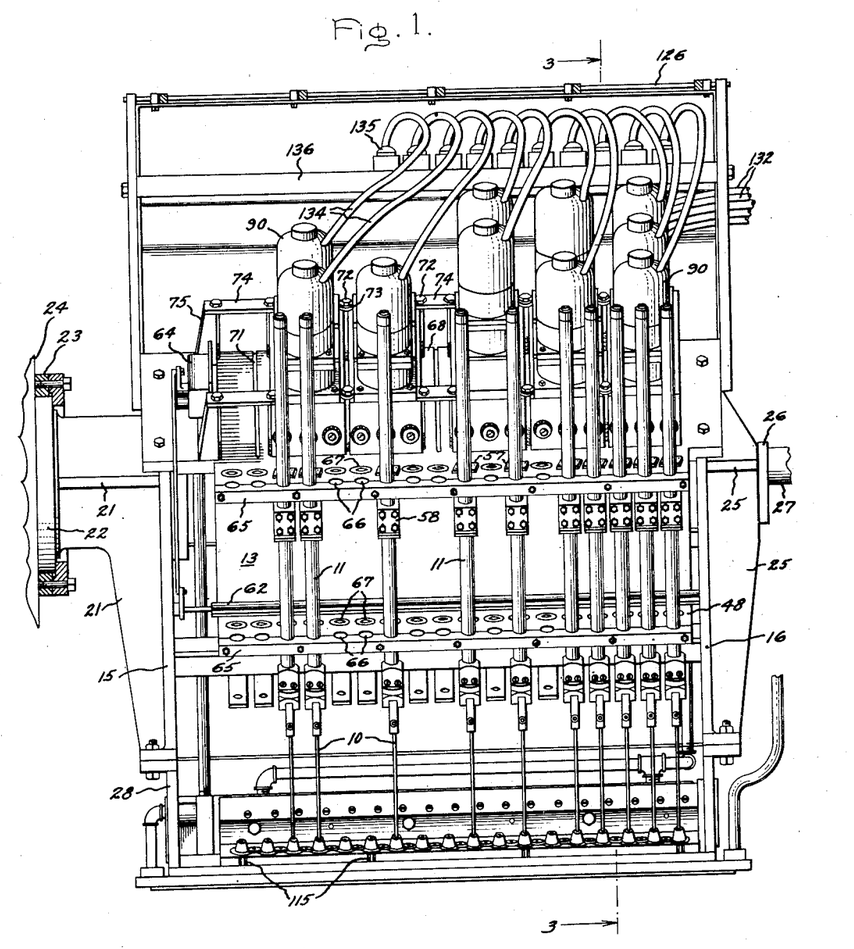
Fig. 1 is a side view and Fig. 2 is an end view of a multi-arc atomic hydrogen welding torch embodying my invention.
Figure 2:
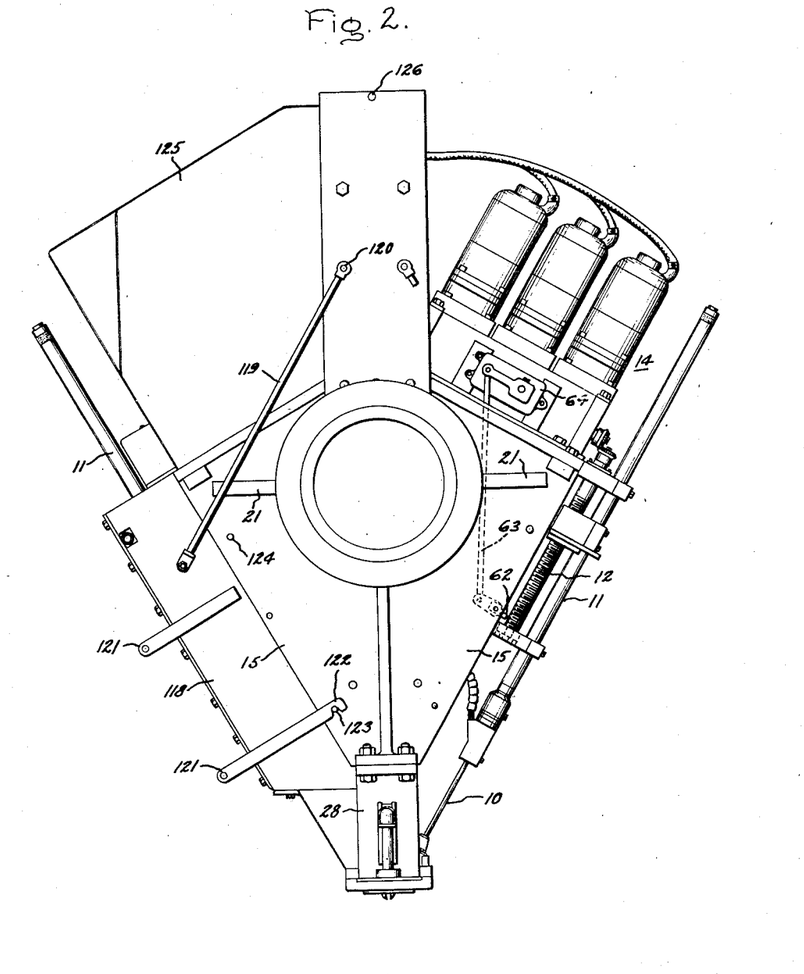
Figure 3:
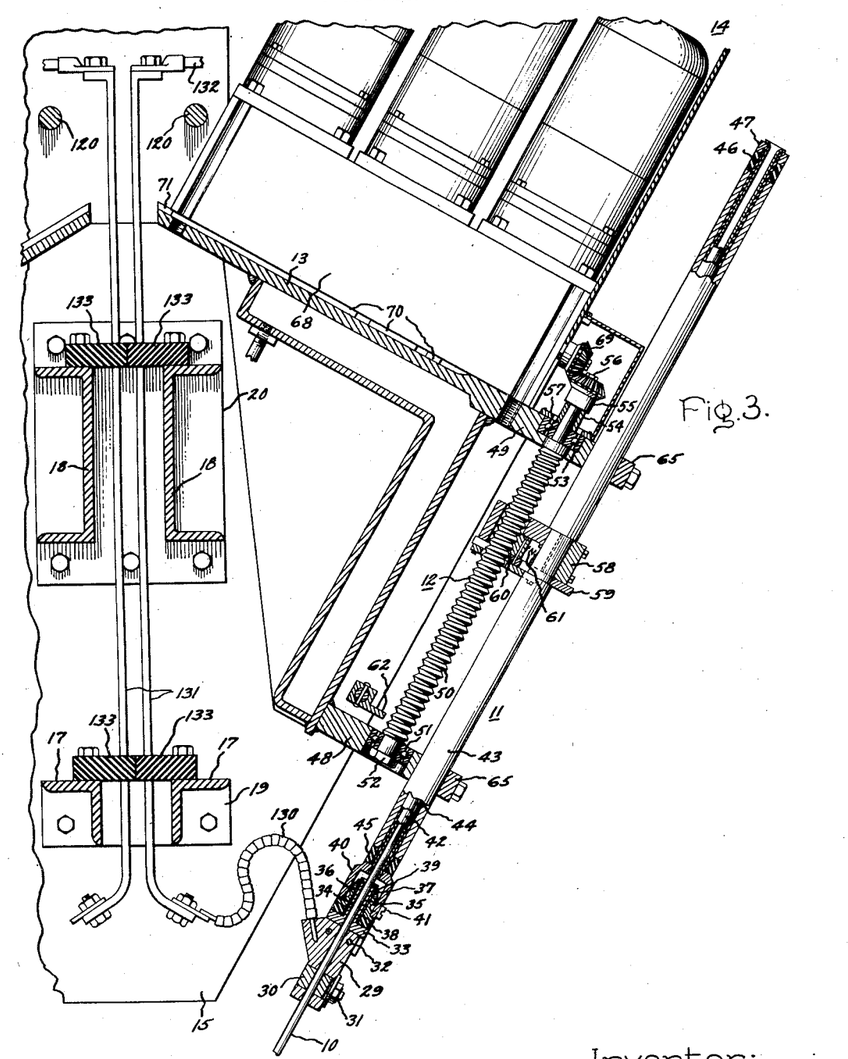
Fig. 3 is a sectional view along lines 3—3 of Fig. 1 illustrating some of the structural details of the torch shown in Figs. 1 and 2.

As best illustrated in Figs. 1, 2 and 3, each electrode 10 of the torch is mounted in identical electrode holders 11 which are provided with identical electrode feeding means 12. The electrode holding and feeding means 11—12 for each electrode 10 are interchangeably supported in two rows in a plurality of positions with an electrode holding and feeding means in one row being inclined to and paired with another electrode holding and feeding means in the other row so that pairs of electrodes in corresponding pairs of electrode holding and feeding means converge into arcing relationship with one another. Each electrode holding and feeding means of a pair, and the electrodes supported thereby, are arranged in different planes each of which is perpendicular to the line of welding but displaced from the other a sufficient distance to stabilize the arc and cause it to lie in a plane approximately coinciding with the line of welding as disclosed and claimed in my United States Letters Patent No. 1,946,305, granted February 6, 1934, for Welding apparatus. The pairs of electrode holding and feeding means located in consecutive positions are so closely spaced that the arcs established between their electrodes constitute a substantially uniform elongated heat source. In the particular torch the spacing is one and one-half inches.

Each row of electrode holding and feeding means is supported on one arm of a hollow fluid cooled electrode drive bracket 13 and a plurality of identical driving mechanisms 14 for these electrode holding and feeding means are supported on the other arm of this electrode drive bracket. The projecting ends of the arm of the electrode drive bracket 13 on which the driving mechanisms 14 are located extend beyond and are bolted to end plates 15 and 16 forming part of the torch frame. As shown in Figs. 2 and 3, these end plates have a kite-like configuration and are joined together at their inside surfaces at their lower portions by two angles 17 and at the upper portions by two channels 17 through the agency of end plates 19 and 20. These plates are welded to the ends of said angles and channels and bolted to the end plates.

The end plate 15 is provided with ribs 21 (Fig. 1), one edge of each of which is welded thereto and the opposite edge of each of which is welded to a ring 22 which is held in a ring clamp 23 mounted on a support 24 for the welding torch. Under certain circumstances the size and weight of the torch may be sufficient to render a second support therefor necessary and, as shown in Fig. 1, the end plate 16 is also provided with ribs 25 welded thereto and to a plate 26 to which a secondary support 27 is attached. This secondary support may be a pipe supported in a bearing coaxial with the clamping ring 23 so that the torch as a whole may be turned about its longitudinal axis. The support for the torch may also provide longitudinal, vertical and tilting adjustments so that the torch may be located in a desired position relative to the work being welded.

The electrodes 10 extend through a nozzle 28 bolted to the lower end of the torch frame. This nozzle directs hydrogen or a hydrogen-containing mixture across the arcing terminals of the electrodes supported therein.

The construction of each of the identical electrode holders is best illustrated in Fig. 3. The electrode 10 is positioned within the electrode holder from which it extends through a terminal block 29. The electrode also extends through a member 30 located in the terminal block and movable relative thereto through the agency of a nut, bolt and washer 31 to clamp the electrode in the terminal block. The upper portion of the terminal block 29 is secured by bolts 32 to the lower portion of an insulated bushing 33. This bushing is provided with a longitudinally extending tubular portion 34 surrounded by a tube of insulation 35 on which a grooved ring 36 is supported between insulating washers 37 and 38 by turning over the upper end of the tubular portion onto a washer 39 which is placed on top of the insulating washer 37. In this way the ring portion 36 of the bushing is electrically insulated from the body portion of the bushing which is attached to the terminal block 29. The bushing 33 is held in a bushing socket 40 by bolts 41 which pass through the grooved portion of ring 36 forming a part thereof. The bushing socket 40 is attached to the lower end of a metallic tube 42 which is located within a metallic tube 43 and insulated therefrom by a tube of insulating material 44. This tube of insulating material extends through an insulating washer 45 located at the lower end of tube 43 and an insulating washer 46 and a metallic washer 47 located at the upper end of tube 43, the socket 40, washers 45, 46 and 47 and tubes 42, 43 and 44 being held in assembled relation by spinning over the upper end of the tube 42 onto the metallic washer 47. The insulating washers 45 and 46 and the tube of insulating material 44 electrically insulate the inner tube 42 from the outer tube 44 which is slidably supported in bearings located at the outer edge portions of flanges 48 and 49 forming part of the electrode feed bracket 13. The electrode 10, it will be noted, extends through the bushing 33 and through the tube 42, both of which are of sufficient size to accommodate it.

The construction of each of the identical electrode feeding units is also illustrated in Fig. 3. It is a unit assembly comprising a threaded shaft 50 having a bearing 51 secured on its lower end by a nut 52 and a bearing 53 secured against a shouldered portion at its upper end by a collar 54 and a bevel gear 55 held in place on the shaft by a nut 56. The assembly is located in registering bearing sockets in flanges 48 and 49 of the electrode drive bracket immediately in back of the bearings for the electrode holder 11. The upper socket is shouldered and bearing 53 is held therein by a plate 57 which is attached by screws to the flange 49 so that the unit is held in place on the electrode drive bracket 13 against end thrust. The threaded portion of the shaft 50 passes through an opening in one end of an arm 58, the other end of which is provided with a clamp which engages the electrode holder intermediate its ends and is positioned thereon between shoulders formed by a portion of reduced cross-section in the outside tube 43 of the electrode holder. The arm 58 is provided with a hand pull 59 on which is mounted a half nut 60 whose threaded portion is normally biased into engagement with the threaded portion of the shaft 50 through the agency of a spring 61. By withdrawing the hand pull 59 and disengaging the nut 60 from the threaded portion of the shaft 50, the electrode holder 11 may be positioned relative to the electrode feeding mechanism 12. Rotation of the shaft 50 causes the nut 60 in the arm 58 to feed the electrode holder 11 and the electrode 10 supported therein to and from the work to strike and maintain an arc between corresponding pairs of electrodes. After an electrode holder 11 has been fed downwardly a predetermined amount, the inner end of the arm 58 engages a trip bar 62 which is connected through a linkage 63 (Fig. 2) to a switch 64. It will be noted that the trip bar 62 may be actuated by any one of the electrode holding and feeding means in the same row. The operation of this switch arrests the feeding action of all the electrodes, and the operator, by withdrawing the hand pull 59, can move any desired electrode holder and arm 58 upwardly along the threaded portion of the shaft 50 and withdraw the electrode 10 from the holder an amount sufficient to bring the arcing terminal of the electrode holder into arcing relationship with its corresponding electrode for another feeding operation.

The flanges 48 and 49 of the electrode drive bracket extend along the upper and lower edges of the downwardly and inwardly inclined arm of each electrode drive bracket 13. These brackets provide a plurality of equally spaced support positions for the electrode holding and feeding means 11 and 12. As shown in Fig. 1, the outer edges of the flanges 48 and 49 are provided with equally spaced semi-cylindrical openings within which the body portion of the electrode holders 11 may be positioned and held in place by strips 65 provided with matching semi-cylindrical openings along their inner edges. When the strips 65 are bolted to the outer edges of the flanges 48 and 49, the semi-cylindrical openings in their edge portions define a plurality of bearings 66 which are equally spaced from one another. The flanges 48 and 49 also provide a plurality of equally spaced bearing sockets 67 within which the bearings 51 and 53 of the electrode feeding mechanisms may be supported. It will be noted by referring to Fig. 3 that by removing the bearing 51 from the end of the shaft 50, this shaft may be inserted through the openings 67 (Fig. 1) in the upper flange 49. By replacing bearing 51 on the end of the shaft 50, the electrode feed unit may then be positioned with its bearings 52 and 53 in registering sockets 67 in flanges 48 and 49 and held in place in these openings by plate 57.

Figure 7:
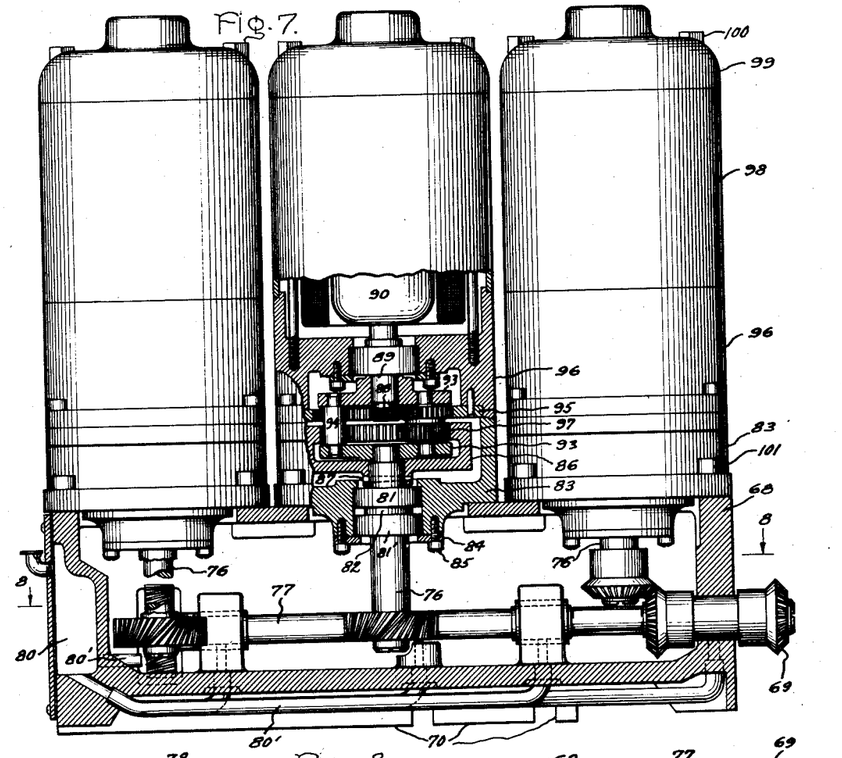
Fig. 7 is a side view with portions broken away illustrating the operating mechanisms for the electrode holding and feeding means.
Figure 8:
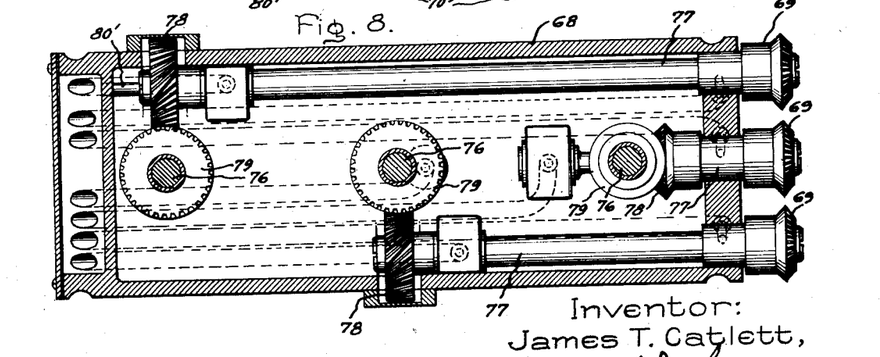
Fig. 8 is a sectional view along lines 8—8 of Fig. 7 illustrating the construction thereof.
Figure 9:
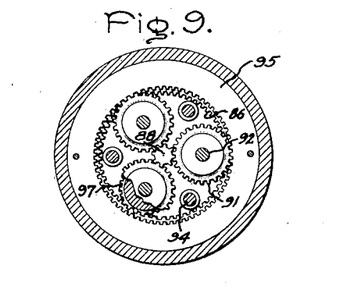
Fig. 9 is a sectional view illustrating the differential planetary gear reduction of each gear motor forming a part of the operating mechanism illustrated in Fig. 7.

The electrode holding and feeding means are operated by a plurality of identical operating mechanisms 14, each of which alone or in side-by-side relationship is capable of operating through three independent transmissions three electrode holding and feeding means located in consecutive positions in their supporting means. The construction of these operating mechanisms is best illustrated in Figs. 7, 8, and 9. They comprise a gear box 68 which includes independent transmissions for operating bevel gears 69 which are equally spaced from one another in accordance with the equal spacing provided by the bearings 66 and bearing sockets 67 in the flanges 48 and 49 of the electrode drive bracket 13. On the bottom at the middle of each gear box, there is a plurality of longitudinal projections constituting a key 70 which is adapted to engage keyways 71 in the upwardly and inwardly inclined arm of each electrode drive bracket 13. These keyways are spaced from one another the same distances that the bearing sockets 67 for the electrode feeding units are spaced in the flanges 48 and 49 of the electrode drive bracket and are so located that gears 69 projecting through the end wall of the gear box will mesh with gears 55 of electrode feed units located in consecutive positions adjacent thereto. Depending on the spacing of the electrode holding and feeding means, the gear boxes 68 are positioned on the upwardly and inwardly extending arm of the electrode drive bracket 13 and held in place thereon by bolts 72 (Fig. 1) which act through washers 73 or strips 74 to engage the upper edges of the gear boxes. It will be noted that the sides of the gear boxes are recessed to accommodate the passage therebetween of the bolts 72. A support 75 is provided at one end of the electrode drive bracket for supporting the ends of strips 74 for the end gear box. The switch 64 referred to above is mounted on this support.

Referring again to Figs. 7, 8, and 9 and the construction of the drive mechanisms 14 there disclosed, it will be noted that each of the gears 69 is connected to drive shafts 76 through shafts 77 and gears 78 and 79. Lubricating oil is supplied from a well 80 in an end wall of the gear box 68 to the bearings for shafts 77 and to the side portions of two of the gears 78 and 79 through pipes 80' containing wicks. This insures adequate lubrication of the transmissions in the gear box. Each drive shaft 76 is supported in bearings 81 and 81' spaced from one another by a collar 82 and clamped in a recess in a frame 83 by a plate 84 attached thereto by screws 85. The inner end of each drive shaft 76 has a ring gear 86 attached thereto by a pin 87. This ring gear is rotated by a gear 88 mounted on the shaft 89 of a motor 90 through a differential planetary gearing of which the gears 86 and 88 form a part. The gear 88 meshes with each of three equally spaced gears 91 supported on shafts 92 located in a cage 93 formed by two end members which are mounted for rotation on the motor shaft 89 and the end of drive shaft 76. The end members of the cage are tied together by rivets 94. Gears 91 mesh with a ring gear 95 pinned to the end frame 96 of the motor 90 and held in a recess therein by the bolting of frame 96 to frame 83. Each of these gears 91 drives a gear 97 which is mounted on the same shaft 92 and meshes with ring gear 86. By employing such a differential planetary gear, a speed reduction of the magnitude of 100:1 is obtained. The motor shell 98 is held between end frames 96 and 99 by bolts 100. The bolted assembly of frames 83, 96, 98 and 99 constitutes a gear motor drive which may be removed as a unit from the gear box 68 by removing bolts 101 so that when one of the gears 69 is not employed for driving one of the feeding mechanisms, the gear motor drive may be removed and a cover plate substituted therefor to cover the opening in the top of the gear box. It is, of course, only necessary to mount a gear motor drive on the box for those gears 69 which mesh with gears 55 of an electrode feeding means.

Figure 4:
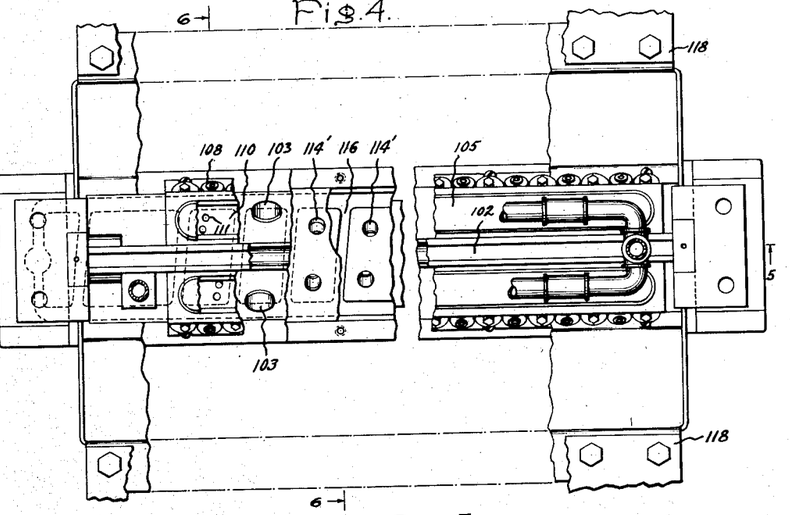
Fig. 4 is a plan view with parts broken away illustrating the construction of the nozzle forming a part of the torch of Figs. 1 and 2.
Figure 5:
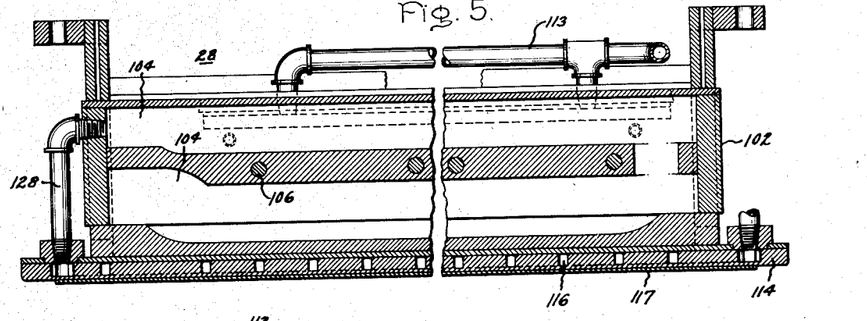
Fig. 5 is a longitudinal sectional view of the nozzle along lines 5—5 of Fig. 4.
Figure 6:
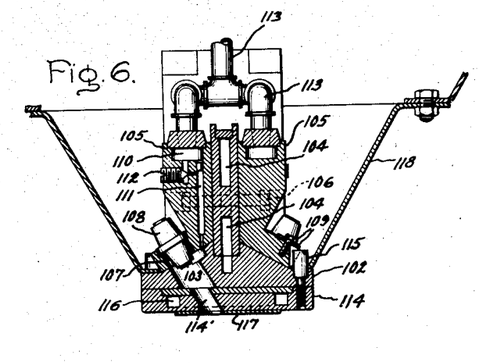
Fig. 6 is a cross-sectional view of the nozzle taken along lines 6—6 of Fig. 4.

Referring to Figs. 4, 5 and 6, the nozzle 28 comprises an elongated support member 102 of substantially T cross-section having longitudinally spaced pairs of transverse electrode passageways 103 in its flange portion and upper and lower longitudinal passageways 104 for cooling fluid in its bar portion. The electrode passageways 103 are located in rows in the flange portion of this support member with corresponding electrode passageways of each pair being arranged on opposite sides of its bar portion, as shown in Fig. 4. The passageways of each pair of electrodes are offset a slight amount from each other lengthwise of the support member to accommodate the slightly offset positions of each pair of electrode holding and feeding means and the electrodes supported thereby. Two angular blocks 105 of substantially the same length as the support member 102 and having one side conforming in configuration and adapted to engage the angular surface between the bar and flange portions of the support member are secured thereto by bolts 106 which pass through the flange portion of the support member intermediate the cooling passageways 104 thereof. One leg of each of the angular blocks is provided with transverse electrode passageways 107 extending therethrough which match respectively with the electrode passageways 103 of the support member 102. An insulating electrode bushing 108 is held in each of the transverse passageways 107 by a bolt and washer 109. The other leg of each angular block is provided with a longitudinally extending gas header 110 from which gas is supplied through passageways 111 to an offset portion in the electrode passageways 103 of the support member 102. Spattered weld metal entering the discharge opening of electrode passageway 103 cannot strike and foul the discharge opening of passageway 111 because the offset portion of passageway 103 interposes a baffling surface that effectively shields it therefrom. The flow of gas through each of the passageways 111 is controlled by a valve whose control member 112 is located to one side of electrodes extending through bushings 108 so as to be readily accessible from the side of the nozzle for purposes of adjustment. Gas is supplied to each of the gas headers 110 through each of the gas pipes 113. A cover plate 114 having pairs of transverse electrode passageways 114' matching with the pairs of electrode passageways in the flange portion of the support member 102 is attached to the bottom of the support member by screws 115. This cover plate is provided with a network of passageways 116 which extend along and between the electrode passageways in the plate. The face of the cover plate which is exposed to the intense heat of the arc and the atomic hydrogen generated thereby is protected by a thin plate of molybdenum 117. A thin plate of tungsten may, however, be substituted for the molybdenum plate. The support member 102, angular blocks 105 and cover plate 114 are unit members formed by brazing together a plurality of component parts. The support member and cover plate may be formed of steel but it is desirable to form the angular blocks of copper or some copper alloy having a high heat conductivity to insure proper cooling thereof by its contact with the water cooled bar portion of the support member.

The electrode holding and feeding means are protected from the heat of the torch and from the flames of burning gas extending upwardly from its nozzle by water-cooled shields 118, one of which is shown in Fig. 2. These shields are pivotally supported by links 119 from the ends of bars 120 which extend lengthwise of the frame of the gas torch. The shields are also provided with handles 121 by means of which the operator may swing them up out of position in order to render the interior of the torch accessible for inspection and adjustment. They are held in their down position by the engagement of latches 122 with pins 123 and in their up position by the engagement of latches 122 with pins 124.

The upper portion of the torch is enclosed by two covers 125 which are pivoted on a rod 126 running lengthwise of the torch frame. The corner portions of these covers are cut away as shown in Fig. 2 to facilitate the movement of shields 118.

Figure 10:
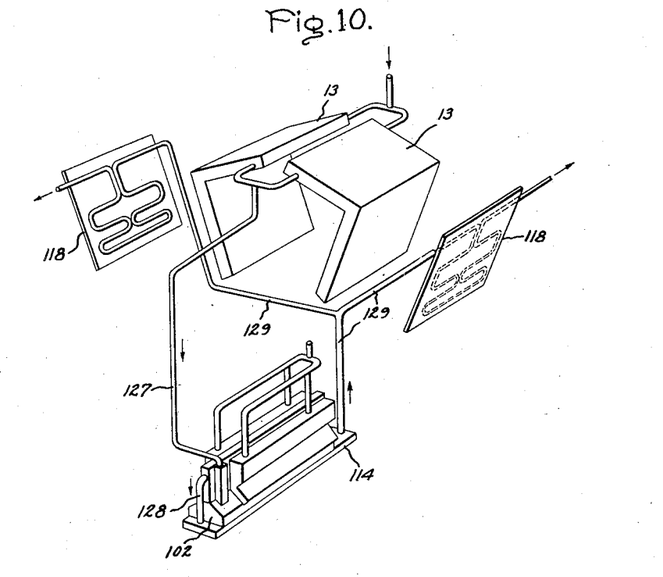
Fig. 10 is a diagrammatic view of the cooling system forming a part of the torch.

The torch's cooling system as a whole is diagrammatically represented in Fig. 10. As shown in this figure, cooling fluid is first supplied to the hollow electrode drive brackets 13 from which it is discharged and supplied through a pipe 127 to the longitudinally extending passageways 104 in the bar portion of the support member 102 of the nozzle. It is discharged from the upper passageway 104 through a pipe 128 into the network of passageways 116 in the cover plate 114 from which it is discharged through pipes 129 to the sinuous cooling passageways formed of piping mounted on the cover plates 118.

Current is supplied to each of the electrodes through its terminal block 29. As shown in Fig. 3, these terminal blocks are connected through conductors 130 to busses 131 which are in turn connected through conductors 132 (Figs. 1 and 3) to the source of supply. The busses 131 are arranged in pairs opposite one another in positions corresponding to the positions in which pairs of electrode holding and feeding means may be supported. They are held in these positions by insulating strips 133 attached to the upper portions of the angles 19 and channels 18 forming part of the torch frame.

Each of the motors 90, as shown in Fig. 1, is electrically connected through a cable 134, a plug 135 and a connection board 136 to panels by means of which the arcing engagement of pairs of electrodes are controlled. In Fig. 1 only the cables for the motors shown have been illustrated since illustration of the cables for the motors not shown would be confusing.

As previously pointed out, a torch embodying my invention provides for interchangeably supporting a limited number of pairs of electrode holding and feeding means in any one of a plurality of positions along the line of welding. It is thus possible to adjust the torch for many methods of welding. It is particularly suited for performing the method of seam welding described and claimed in my copending application Serial No. 315,996, filed concurrently herewith and entitled Method of seam welding. In accordance with this method of welding, heat is progressively applied to a seam as rapidly as possible until the leading end of an elongated pool of molten metal begins to form, then at a more gradual rate commensurate with the decreased thermal conductivity of the pool until the non-molten edges of the seam below the pool have been raised to a forge welding temperature, and finally at a rate which permits the trailing end of the pool to solidify from the bottom upwardly. While heat is thus being applied to the seam, a side pressure is also applied to the seam. This side pressure progressively closes the seam before the formation of the above referred to pool of molten metal, then completes a forge weld at the bottom of the seam with a sufficient de-formation to fill its top portion with molten metal, and finally holds the seam securely during the time necessary for the welded portions to become strong enough to withstand the stresses resulting from the welding operation. In the set-up shown in Fig. 1 of the drawings, if the torch is stationary the work travels from right to left and the pairs of electrodes are located in the following positions:

1—2—3—4—5—X—6—X—7—X—X—8—
X—X—9—10

It is, of course, apparent in view of the above description that the grouping of the electrode holding and feeding mechanisms 11—12, the grouping of the driving mechanisms 14, and the locations of the motors 90 thereon may be such as to obtain any desired electrode spacing along the line of welding. In view of the above description of the physical structure of the torch, the method of making the desired set-up is obvious.

It is apparent that the equal spacing for the electrode holding and feeding means provided in the above described torch is not essential since other spacings may be employed without departing from the spirit and scope of my invention which is susceptible of being variously modified to meet different conditions encountered in its use. I, therefore, aim in the appended claims to cover all modifications which fall within the true spirit and scope of my invention.

What I claim as new and desire to secure by Letters Patent of the United States, is:

1. A welding torch comprising a plurality of identical means for holding and feeding electrodes, means for interchangeably supporting said electrode holding and feeding means along a line of welding in any one of a plurality of spaced positions greater in number than the number of said electrode holding and feeding means, a motor for each of said electrode holding and feeding means, and unitary means comprising a plurality of transmissions for connecting groups of said motors mounted on said unitary means with groups of said electrode holding and feeding means located in adjacent positions in their said supporting means.

2. A welding torch comprising a plurality of identical means for holding and feeding electrodes, means for interchangeably supporting said electrode holding and feeding means along a line of welding in any one of a plurality of equally spaced positions greater in number than the number of said electrode holding and feeding means, a motor for each of said electrode holding and feeding means, unitary means arranged transverse to the line of welding for connecting groups of said motors mounted thereon with groups of said electrode holding and feeding means located in consecutive positions in their said supporting means, and means for supporting said unitary means in a plurality of positions corresponding with the distribution of said electrode holding and feeding means along the line of welding.

3. A welding torch comprising a plurality of identical electrode holding and feeding means, means for interchangeably supporting said electrode holding and feeding means in two rows in a plurality of positions greater in number than the number of said electrode holding and feeding means in said rows with an electrode holding and feeding means in one row being inclined to and paired with an electrode holding and feeding means in the other row so that pairs of electrodes in said pairs of electrode holding and feeding means converge into arcing relationship with one another, a motor for each of said electrode holding and feeding means, and a plurality of identical means for grouping said motors in rows transverse to said rows of electrode holding and feeding means, each of said means having driving connections between the motors in any one of said rows and the electrode holding and feeding means that are located immediately adjacent one another and the motors in said row.

4. A welding torch comprising a plurality of identical means for holding and feeding electrodes, means for interchangeably supporting said electrode holding and feeding means in a row in any one of a plurality of equally spaced positions along the line of welding, a plurality of identical mechanisms each of which alone or in side-by-side relationship has a plurality of independent transmissions spaced to engage a group of said electrode holding and feeding means located in consecutive positions in their said supporting means, means for interchangeably supporting said mechanisms in any one of a plurality of positions spaced to match the spacing of said electrode holding and feeding means in their said supporting means, a motor for each of said electrode holding and feeding means, and means for mounting on said mechanism in driving engagement with the transmissions thereof a grouping of said motors required by the grouping of electrode holding and feeding means operated through said mechanisms.

5. A welding torch comprising a plurality of identical means for holding and feeding electrodes, each of said holding and feeding means including a terminal block within which an electrode is clamped and through which arcing current is supplied thereto, means for interchangeably supporting said electrode holding and feeding means in a row along a line of welding in any one of a plurality of spaced positions greater in number than the number of said electrode holding and feeding means, means including a plurality of busses for supplying arcing current to said terminal blocks forming part of said electrode holding and feeding means, means for supporting said busses in a row in positions corresponding to the spaced positions along the line of welding in which said electrode holding and feeding means may be positioned by their said supporting means, a nozzle having electrode positions corresponding to the spaced positions in which said electrode holding and feeding means may be positioned by their said supporting means, and means for supplying gas to said nozzle about the arcing terminals of electrodes projecting therethrough and supported by said electrode holding and feeding means.

6. A welding torch comprising a plurality of identical means for holding and feeding electrodes, means for interchangeably supporting said electrode holding and feeding means in a row along the line of welding in any one of a plurality of spaced positions greater in number than said electrode holding and feeding means, means for independently adjusting said electrode holding and feeding means in said supporting means toward and away from the weld, a switch having an operating member extending lengthwise of said supporting means adjacent said spaced positions therein for said electrode holding and feeding means, and means associated with each of said electrode holding and feeding means for engaging said operating member and thereby operating said switch when any one of said electrode holding and feeding means has moved toward the weld to a predetermined position.

7. A gas-arc torch comprising a nozzle having a row of spaced chambers for electrodes extending through said nozzle, passageways individual to each of said chambers for supplying gas to said chambers and about the arcing terminals of electrodes extending therethrough, and adjusting means in each of said passageways for independently controlling the flow of gas to said chambers, said adjusting means being accessible from the side of said nozzle and being located to one side of the electrodes extending through said nozzle.

8. A nozzle for a gas-arc torch comprising an elongated support member of substantially T cross-section having longitudinally spaced pairs of transverse electrode passageways in its flange portion and a longitudinal passageway for cooling fluid in its bar portion, said electrode passageways being located in rows in the flange portion of said support member with corresponding electrode passageways of each pair being arranged on opposite sides of the bar portion of said support member, two angular blocks of substantially the same length as said support member and having one side conforming in configuration and adapted to engage the angular surface between the bar and flange portions of said support member, one leg of each angular block having spaced transverse electrode passageways extending therethrough and the other leg thereof having a longitudinally extending gas header and spaced transverse gas passageways extending therefrom to its surface adapted to engage the flange portion of said support member, said electrode and gas passageways being matched with the electrode passageways in the flange portion of said support member, a cover plate having pairs of transverse electrode passageways matching with the pairs of electrode passageways in the flange portion of said support member and having a cooling passage extending lengthwise thereof, means for assembling said support member, said angular blocks, and said cover plate with corresponding electrode passageways in register with one another, means for connecting the cooling fluid passageways in said support member and said cover plate to a source of cooling fluid, and means for supplying gas to each of the headers in said angular blocks.

9. A nozzle for a gas-arc torch comprising an elongated support member of substantially T cross-section having longitudinally spaced pairs of transverse electrode passageways in its flange portion and a longitudinal passageway for cooling fluid in its bar portion, said electrode passageways being located in rows in the flange portion of said support member with corresponding electrode passageways of each pair being arranged on opposite sides of the bar portion of said support member and said electrode passageways having offset portions adjacent the intersection of the flange and bar portions of said support member, two angular blocks of substantially the same length as said support member and having one side conforming in configuration and adapted to engage the angular surface between the bar and flange portion of said support member, one leg of each angular block having spaced transverse electrode passageways extending therethrough and the other leg thereof having a longitudinally extending gas header and spaced transverse gas passageways extending therefrom to its surface adapted to engage the flange portion of said support member, said electrode and gas passageways being matched respectively with the electrode passageways in the flange portion of said support member and the offset portions of said electrode passageways, a cover plate having pairs of transverse electrode passageways matching with the pairs of electrode passageways in the flange portion of said support member and having a cooling passage extending lengthwise thereof, means for assembling said support member, said angular blocks, and said cover plate with corresponding electrode passageways in register with one another and with said gas passageways in said angular blocks in register with the offset portions of said electrode passageways in the flange portion of said support member, means for connecting the cooling fluid passageways in said support member and said cover plate to a source of cooling fluid, and means for supplying gas to each of the headers in said angular blocks.

10. A nozzle for a gas-arc torch comprising an elongated support member of substantially T cross-section having longitudinally spaced pairs of transverse electrode passageways in its flange portion and a longitudinal passageways for cooling fluid in its bar portion, said electrode passageways being located in rows in the flange portion of said support member with corresponding electrode passageways of each pair being arranged on opposite sides of the bar portion of said support member and said electrode passageways having offset portions adjacent the intersection of the flange and bar portions of said support member, two angular blocks of substantially the same length as said support member and having one side conforming in configuration and adapted to engage the angular surface between the bar and flange portion of said support member, one leg of each angular block having spaced transverse electrode passageways extending therethrough and the other leg thereof having a longitudinally extending gas header and spaced transverse gas passageways extending therefrom to its surface adapted to engage the flange portion of said support member, said electrode and gas passageways being matched respectively with the electrode passageways in the flange portion of said support member and the offset portions of said electrode passageways, a valve in each of said gas passageways having its control member located to one side of the electrodes extending through said electrode passageways and being accessible from the side of said nozzle for purposes of adjustment, a cover plate having pairs of transverse electrode passageways matching with the pairs of electrode passageways in the flange portion of said support member and having a cooling passage extending lengthwise thereof, means for assembling said support member, said angular blocks, and said cover plate with corresponding electrode passageways in register with one another and with said gas passageways in said angular blocks in register with the offset portions of said electrode passageways in the flange portion of said support member, means for connecting the cooling fluid passageways in said support member and said cover plate to a source of cooling fluid, and means for supplying gas to each of the headers in said angular blocks.

11. A gas-arc welding torch comprising a plurality of identical means for holding and feeding electrodes, each of said holding and feeding means including a terminal block within which an electrode is clamped and through which welding current is supplied thereto, means for interchangeably supporting said electrode holding and feeding means in two rows in a plurality of positions greater in number than the number of electrode holding and feeding means in said rows with an electrode holding and feeding means in one row being inclined to and paired with a electrode holding and feeding means in the other row so that electrodes in said pairs of electrode holding and feeding means converge into arcing relationship with one another, a switch, means associated with each of said electrode holding and feeding means in a row for operating said switch when any one of said electrode holding and feeding means in said row has moved to a predetermined position, means including a plurality of busses for supplying arcing current to said terminal blocks, means for supporting said busses in two rows in positions corresponding to the spaced positions along the line of welding in which said electrode holding and feeding means may be positioned by their said supporting means, a plurality of identical mechanisms each of which alone or in side-by-side relationship has a plurality of independent transmissions spaced to engage a group of said electrode holding and feeding means located in the same row in consecutive positions in their said supporting means, means for interchangeably supporting said mechanisms along either of said rows of electrode holding and feeding means in any one of a plurality of positions spaced to match the spacing of said electrode holding and feeding means in their said supporting means, a motor for each of said electrode holding and feeding means, means for mounting on said mechanisms in driving engagement with the transmissions thereof a group of said motors required by the grouping of said electrode and feeding means operated through said mechanisms, a nozzle having a longitudinal passageway for cooling fluid and a plurality of transverse chambers with offset portions spaced from their discharge openings, said chambers being located in said nozzle in positions corresponding to the spaced positions along the line of welding in which said electrode holding and feeding means may be positioned by their said supporting means and said chambers being constructed to enclose and direct gas about the arcing terminal portions of electrodes extending therethrough and supported by said electrode holding and feeding means, means for supplying gas to the offset portions of said chambers in a manner such that the discharge openings for the gas are shielded from spatter entering the discharge openings of said chambers, means for controlling the flow of gas into each of said chambers, and means for circulating a cooling fluid through said nozzle.

JAMES T. CATLETT.

CERTIFICATE OF CORRECTION.

Patent No. 2,282,031.  May 5, 1942.

JAMES T. CATLETT.

It is hereby certified that error appears in the printed specification of the above numbered patent requiring correction as follows: Page 5, first column, line 41, claim 4, for "mechanism" read --mechanisms--; line 46, claim 5, before "welding" insert --gas-arc--; and that the said Letters Patent should be read with this correction therein that the same may conform to the record of the case in the Patent Office.

Signed and sealed this 16th day of June, A. D. 1942.

Henry Van Arsdale,
Acting Commissioner of Patents.

(Seal)